(12) United States Patent
Vokhmin

(10) Patent No.: US 6,496,253 B1
(45) Date of Patent: Dec. 17, 2002

(54) METHOD AND SYSTEM FOR AUTOMATIC NON-CONTACT MEASUREMENTS OF OPTICAL PROPERTIES OF OPTICAL OBJECTS

(75) Inventor: Peter A. Vokhmin, Ariel (IL)

(73) Assignee: Prolaser, Ltd., Rosh Haayin (IL)

( * ) Notice: Subject to any disclaimer, the term of this patent is extended or adjusted under 35 U.S.C. 154(b) by 52 days.

(21) Appl. No.: 09/588,067

(22) Filed: Jun. 6, 2000

(30) Foreign Application Priority Data

Jun. 14, 1999 (IL) ................................................. 130465

(51) Int. Cl.⁷ ................................................. G01B 9/00
(52) U.S. Cl. ....................................................... 356/124
(58) Field of Search ................................. 356/124–127

(56) References Cited

U.S. PATENT DOCUMENTS

| | | | |
|---|---|---|---|
| 4,641,961 A | 2/1987 | Yamada | |
| 4,810,895 A | 3/1989 | Kafri et al. | |
| 5,301,004 A | 4/1994 | Percival et al. | |
| 5,307,141 A | 4/1994 | Fujieda | |
| 5,489,978 A | 2/1996 | Okumura et al. | |
| 5,825,476 A | 10/1998 | Abitol et al. | |
| 5,835,207 A | * 11/1998 | Suguira et al. | 356/124 |
| 5,847,822 A | * 12/1998 | Suguira et al. | 356/239 |
| 5,855,074 A | 1/1999 | Abitbol et al. | |
| 5,872,625 A | 2/1999 | Kajino et al. | |
| 5,896,194 A | 4/1999 | Yanagi et al. | |
| 5,910,836 A | 6/1999 | Ikezawa et al. | |
| 5,917,586 A | 6/1999 | Ikezawa | |
| 6,118,528 A | * 9/2000 | Yanagi | 356/246 |

FOREIGN PATENT DOCUMENTS

| | | |
|---|---|---|
| DE | 197 12 831 A1 | 10/1997 |
| WO | WO 95/34800 | 12/1995 |

* cited by examiner

Primary Examiner—Michael P. Stafira
(74) Attorney, Agent, or Firm—Oliff & Berridge, PLC

(57) ABSTRACT

Automatic non-contact measuring optical properties of an optical object is performed by a system comprising a light source, a reference pattern, and an imaging and detecting means and an image processing means for producing a measurement output. At least the reference pattern and the imaging and detecting means are disposed on an optical axis of the system. The system further comprises a support for the optical object located between the reference pattern and the imaging and detecting means for disposing thereon the optical object coaxially with the pattern and the imaging and detecting means. The light source is capable of directing to the pattern an illuminating light in such a manner as to produce a plurality of illuminating light beams outcoming from each point of the pattern at different angles. The imaging and detecting means is capable of obtaining an image of the pattern through the optical objects so that each imaging beam is conjugate with only one of the illuminating beams, and of recording the image for its processing by the image processing means.

26 Claims, 13 Drawing Sheets

METHOD AND SYSTEM FOR AUTOMATIC NON-CONTACT MEASUREMENTS OF OPTICAL PROPERTIES OF OPTICAL OBJECTS

FIELD OF THE INVENTION

This invention relates to automatic non-contact measurements of optical properties of optical objects, particularly, to mapping optical objects.

BACKGROUND OF THE INVENTION

The present invention particularly refers to a method and system for mapping an ophthalmic element, where optical properties of the element such as its optical power are measured simultaneously along the element's entire surface. U.S. Pat. No. 4,810,895, U.S. Pat. No. 5,825,476, and U.S. Pat. No. 5,896,194 illustrate different kinds of such methods and systems.

U.S. Pat. No. 4,810,895 discloses a method and apparatus for moire ray deflection mapping, where properties of an object are determined by producing a diverging beam of direct light from a point radiation source, passing this beam through a first optical system including the object to be examined, which system retraces the light in the form of a converging beam of reflected light from the examined object back towards the point source. The converging beam of reflected light is intercepted before reaching the point source and is passed through a second optical system which collimates the beam of reflected light. The collimated beam is then directed through first and second gratings at a preselected angular orientation with respect to each other to produce moire fringe patterns providing an indication of the properties of the examined object.

U.S. Pat. No. 5,825,476 discloses an apparatus for mapping an optical object, including a light source directing a light beam towards the optical object, an array of microlenses which divide the light beam passed through the optical object into a plurality of light beams at least some of which differ from each other, and form on a diffusive screen a corresponding plurality of images of the light source, a camera for recording these images and a computer for processing the multiple images and comparing them with a reference pattern.

U.S. Pat. No. 5,896,194 discloses an apparatus which includes a first light source for generating a lens-characteristic measuring light beam, a second light source for generating a position specifying light beam, a pattern plate with lens-characteristic measuring patterns and position specifying patterns, on which the beams from the light sources are projected through an inspected optical object to receive images of the patterns on a diffusive screen. The received images are analyzed, and the lens-characteristic mapping display of the inspected lens is performed.

SUMMARY OF THE INVENTION

It is the object of the present invention to provide a novel method and system for automatic non-contact measuring optical properties of an optical object.

In accordance with one aspect of the present invention, there is provided a method for automatic non-contact measuring optical properties of an optical object by means of a system comprising a light source, a reference pattern, an imaging and detecting means, at least the reference pattern and the imaging and detecting means being disposed on an optical axis of the system, and an image processing means. The method of the present invention comprising the steps of:

(a) disposing said optical object between said reference pattern and said imaging and detecting means coaxially therewith;

(b) directing to said pattern an illuminating light from said light source in such a manner as to produce a plurality of illuminating light beams outcoming from each point of the pattern at different angles;

(c) imaging said pattern through said optical object by means of imaging beams each of which is conjugate with only one of said illuminating beams and detecting the image, by said imaging and detecting means, and (d) processing said image by said image processing means and producing a measurement output, preferably by comparing the image with an image of said pattern obtained by said imaging and detecting means in the absence of said optical object.

According to another aspect of the present invention, there is provided a system for automatic non-contact measuring optical properties of an optical object, comprising a light source, a reference pattern, an imaging and detecting means, at least the reference pattern and the imaging and detecting means being disposed on an optical axis of the system, a support for the optical object located between said reference pattern and said imaging and detecting means for disposing thereon the optical object coaxially with said pattern and said imaging and detecting means, said light source being capable of directing to said pattern an illuminating light in such a manner as to produce a plurality of illuminating light beams outcoming from each point of the pattern at different angles, said imaging and detecting means being capable of obtaining an image of said pattern through said optical object so that each imaging beam is conjugate with only one of said illuminating beams, and of recording said image, and an image processing means for processing said image and producing a measurement output.

In the method and system according to the present invention, the pattern and the light source illuminating it are so designed as to ensure that the light outcoming from the illuminated reference pattern is scattered, whereby said plurality of illuminating beams outcoming from each point of the pattern is provided. The conjugation of each imaging beam with only one of said plurality of illuminating beams is achieved by said imaging and detecting means including a detector camera with a camera lens whose entrance pupil allows only an extremely narrow light beam to pass therethrough. Thereby, the detector camera in fact chooses from the plurality of illuminating beams only those whose angles of incidence on the inspected optical object suit the setup of the imaging and detecting means, and uses these beams for forming the image of the reference pattern.

To provide the scattered light outcoming from the reference pattern, the light source may be in the form of a diffusive illuminator or it may be an arbitrary monochromatic light source whose light is specifically diffused prior to its impinging the reference pattern. In this case the reference pattern may be formed on transparent material such as mineral glass or it may be rather formed on a plate with a coating providing a total internal reflection. Alternatively, the pattern itself may be made of, or formed on, a diffusing (scattering) material (reflecting or transmitting) such as milky glass, ground glass or paper.

The reference pattern is preferably in the form of a number of regularly arranged pattern elements having known dimensions and shapes and known mutual disposition. For example, these elements may be points, lines or circles, concentric circular and radial lines, staggered squares, regular grid and the like. The pattern may have highlighted origin lines. It may be designed as a black pattern on a bright background or white pattern on a dark background. It may be in the form of a plurality of openings or slits.

With the method and system of the present invention, the inspected optical object introduces, due to its refractive properties, deformation into dimensions, shapes and/or positions of the elements of the imaged pattern. Thus, spherical power leads to the magnification of the imaged pattern elements. Cylindrical optical power leads to their deformation with the direction of the deformation indicating to the orientation of the cylinder axis. Prismatic power leads to the parallel displacement of the elements of the pattern image relative to their reference position, with the direction of the displacement indicating to the orientation of the prism axis. Measurements of these deformations enable the calculation of the optical object's refractive properties at any point and, if desired, their presentation in the form of a map of the optical object along its entire inspected area. The map may be a spherical optical power map, a cylindrical optical power map or a prismatic optical power map, the two latter maps being each accompanied by a corresponding vector field characterizing the direction of the respective cylinder or prism axes at different areas of the inspected optical object. Alternatively, the map may be in the form of a topographic map presenting point-to-point heights of the optical object's inspected surface.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EMBODIMENTS

Figure 1:
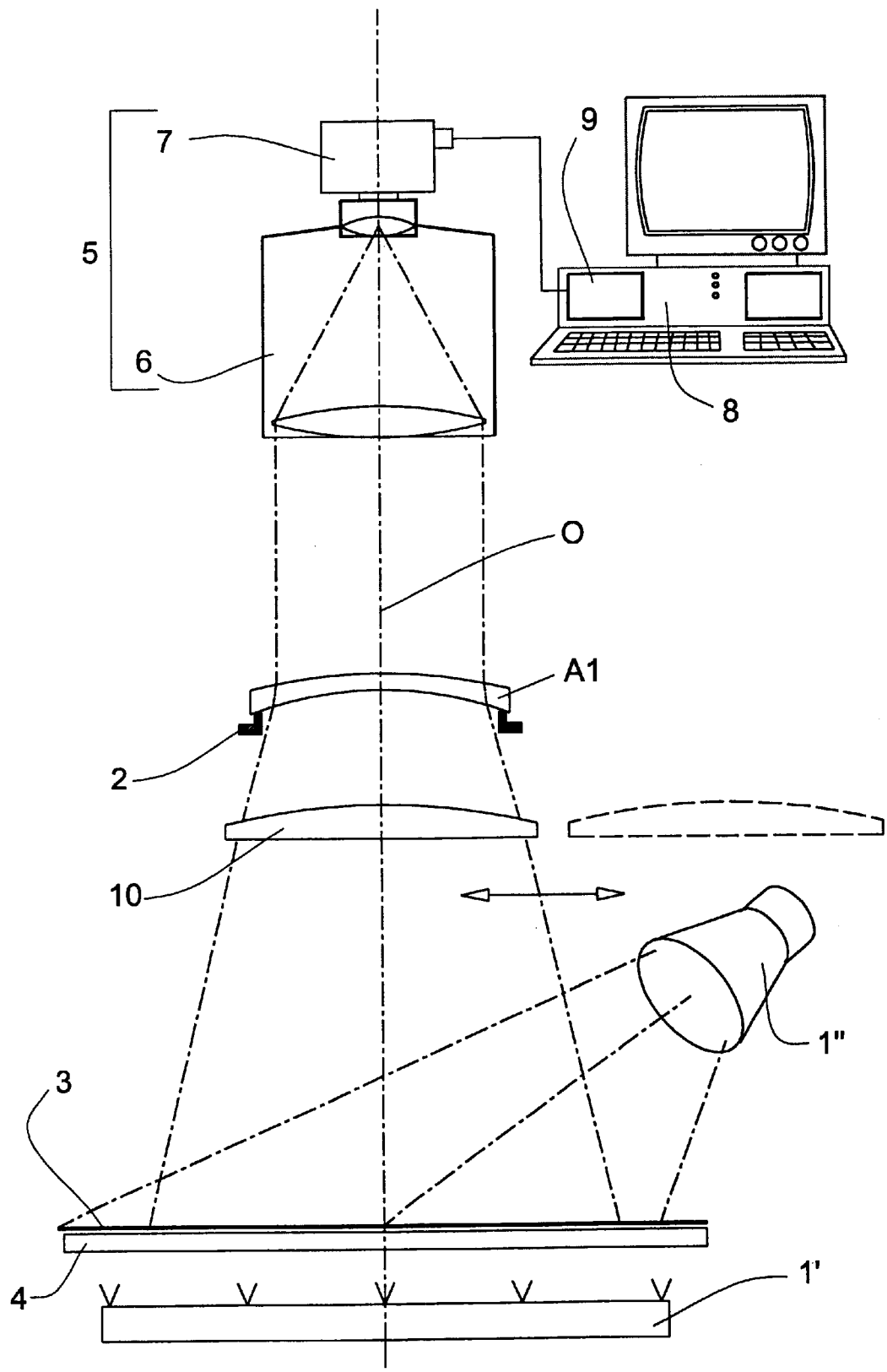
FIG. 1 is a schematic illustration of a system according to one embodiment of the present invention.

FIG. 1 illustrates a system for automatic non-contact measuring optical properties of an optical object A1, according to one embodiment of the present invention. The system shown in FIG. 1 comprises a monochromatic light source 1' or 1", a support 2 on which the optical object A1 is mounted, a precision reference pattern 3 formed on a diffusive plate 4 and having regularly arranged elements with known dimensions and shapes and known mutual disposition, an imaging and detecting means 5, and an image processing means 8.

The reference pattern 3, the optical object A1 and the imaging and detecting means are all disposed along a common optical axis O, the object A1 being disposed at a predetermined distance from the reference pattern 3. The light source 1' is also located on the optical axis and is to be used when the diffusive plate 4 on which the pattern 3 is formed, is transparent. However, if the diffusive plate 4 is a reflecting plate, the light source 1" is located aside from the optical axis O so as to illuminate the diffusive plate 4 and its pattern 3 at an angle to the optical axis.

The imaging and detecting means 5 include a focusing optics 6, which in this case is of a telecentric or telescopic type with a high depth of focus and a detector camera 7 with a camera lens having a narrow entrance pupil (not designated) disposed at the focus of the focusing optics 6, and having a light detecting element that is not shown. Preferably, the detector camera 7 is in the form of a high resolution camera such as CCD TV or still camera, CID or CMOS camera.

Output of the detector 7 is connected to the image processing means 8 via a frame grabber 9. The image processing means 8 is in the form of a computer having a program to determine optical parameters of the inspected object A1 by processing an image of the reference pattern. However, different monitoring and analyzing systems may be used.

Depending on the type of the inspected optical object, the apparatus of the present invention may further include accessory compensating lens 10, positive or negative, with known optical characteristics for partly compensating of the inspected object's respective negative or positive optical power. The use of the compensating lens 10 enables broadening the range of lenses to be inspected by the apparatus. For the same purposes, the reference pattern 3 may be built in the form of an up and down moveable unit. Inspected optical objects of high power would need positioning the reference pattern at closer distance thereto than those of low power.

In operation, a light beam from the illuminator 1' or 1" is directed to the reference pattern 3 through the diffusive plate 4, whereby it is provided that the light outcoming from each point of the reference pattern 3 is scattered, i.e. a plurality of illuminating beams is formed outcoming from each point of the pattern. This is shown in more detail in FIG. 2. The illuminating beams pass through the optical object A1 but only those of them will form an image of the reference pattern 3 that enter the focusing optics 6 as substantially parallel light beams and, consequently, pass the entrance pupil of the detector camera 7. Ray tracing in this case is mathematically equivalent to the ray tracing in a system with a point light source placed at the position of the entrance pupil of the camera lens 7, and a projecting screen placed at the position of the reference pattern 3. The optical setup in terms of lens refractive characteristic measurement is equivalent to the setup for measurements by a collimated light beam, so that mathematics developed for Hartmann method of power measurement may be applied providing results similar to the Hartmann method results.

The image of the reference pattern thus obtained is detected and recorded by means of the detector camera 7.

Figure 8:
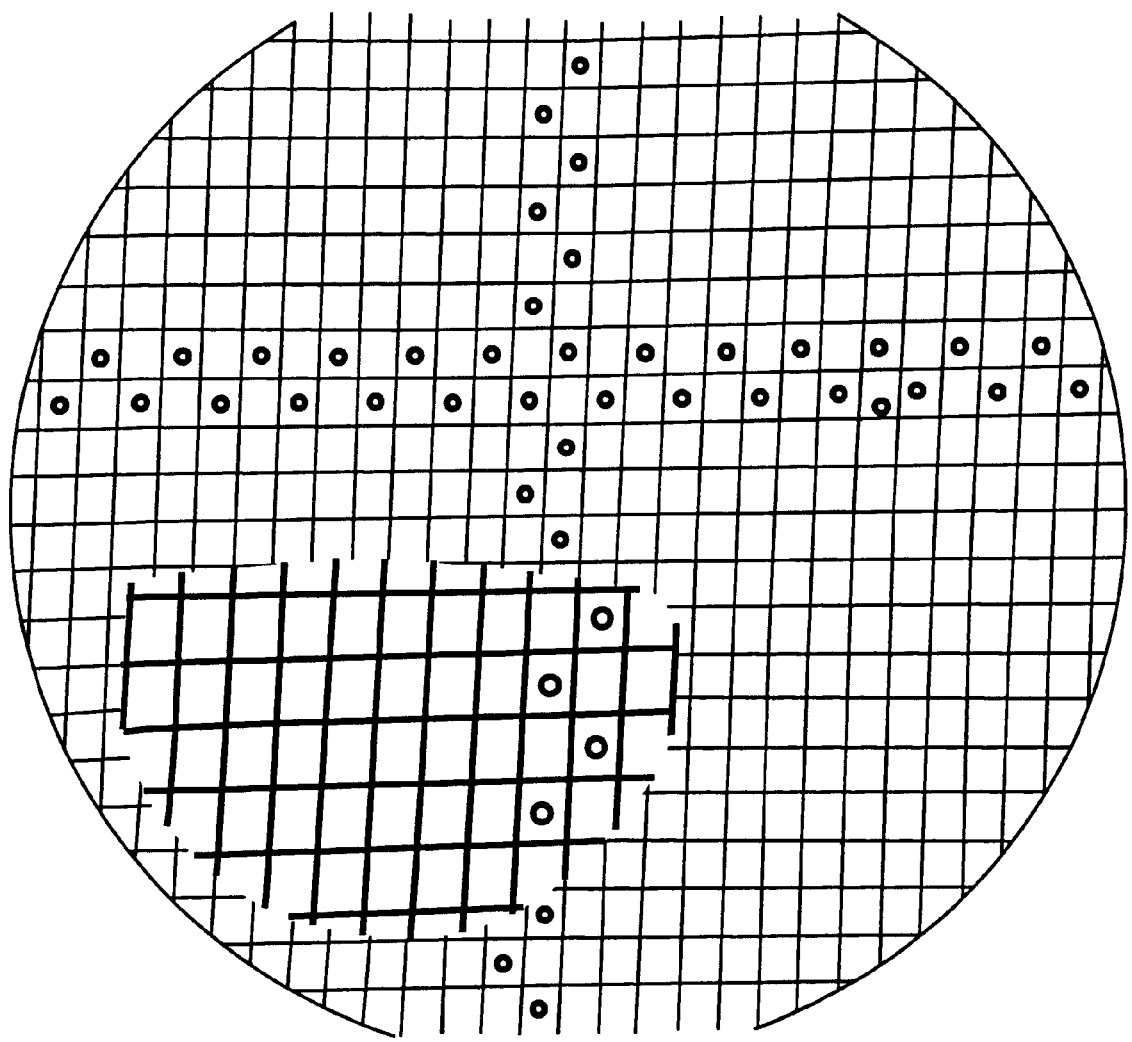
FIGS. 8 and 9 represent examples of images of a reference pattern obtained by a system according to the present invention, through, respectively, a bifocal lens and a progressive lens.
Figure 9:
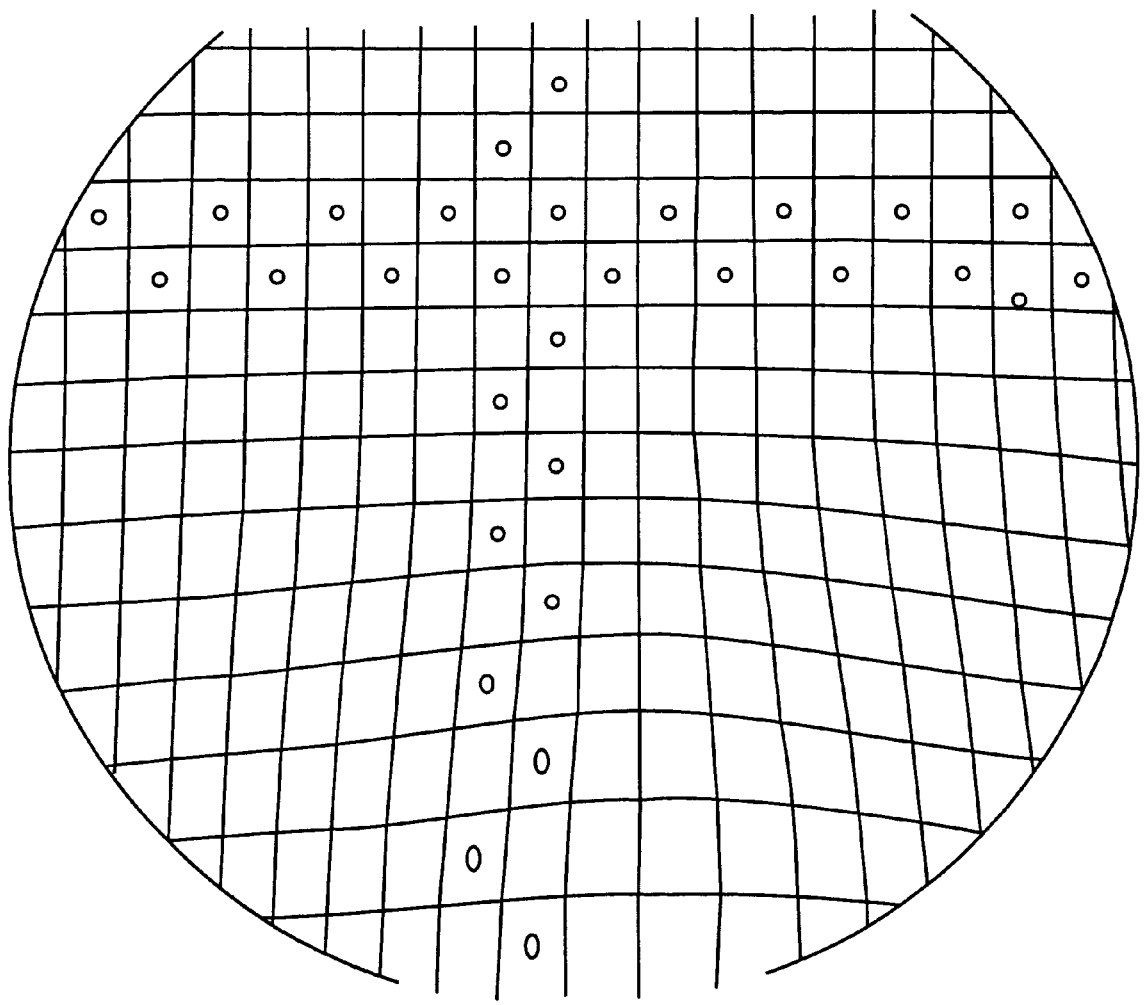

Examples of images of a pattern, which is a regular squared grid, recorded by a CCD camera in testing of different ophthalmic lenses are shown in FIGS. 8 and 9. FIG. 8 represents an image of the reference pattern obtained through a bifocal lens with its base spherical and cylindrical power and a segment of additional power, and FIG. 9 represents an image of the reference pattern obtained through a progressive lens.

The image recorded by the detector camera 7 is transferred to the computer 8 via the frame grabber 9, to identify the reference pattern control elements (e.g. points and/or lines, or the like) by means of a dedicated software, and to analyze the deformation introduced into the image of the reference pattern by the inspected object. The analysis is performed by the comparison of measured coordinates and shape of the pattern elements in the image of the reference pattern with those of an image of the reference pattern obtained by the imaging and detecting means 5 in the absence of the optical object, that is stored in the computer's memory. Based on this comparison, the deformation of the pattern image caused by the inspected optical object is determined.

Figure 2:
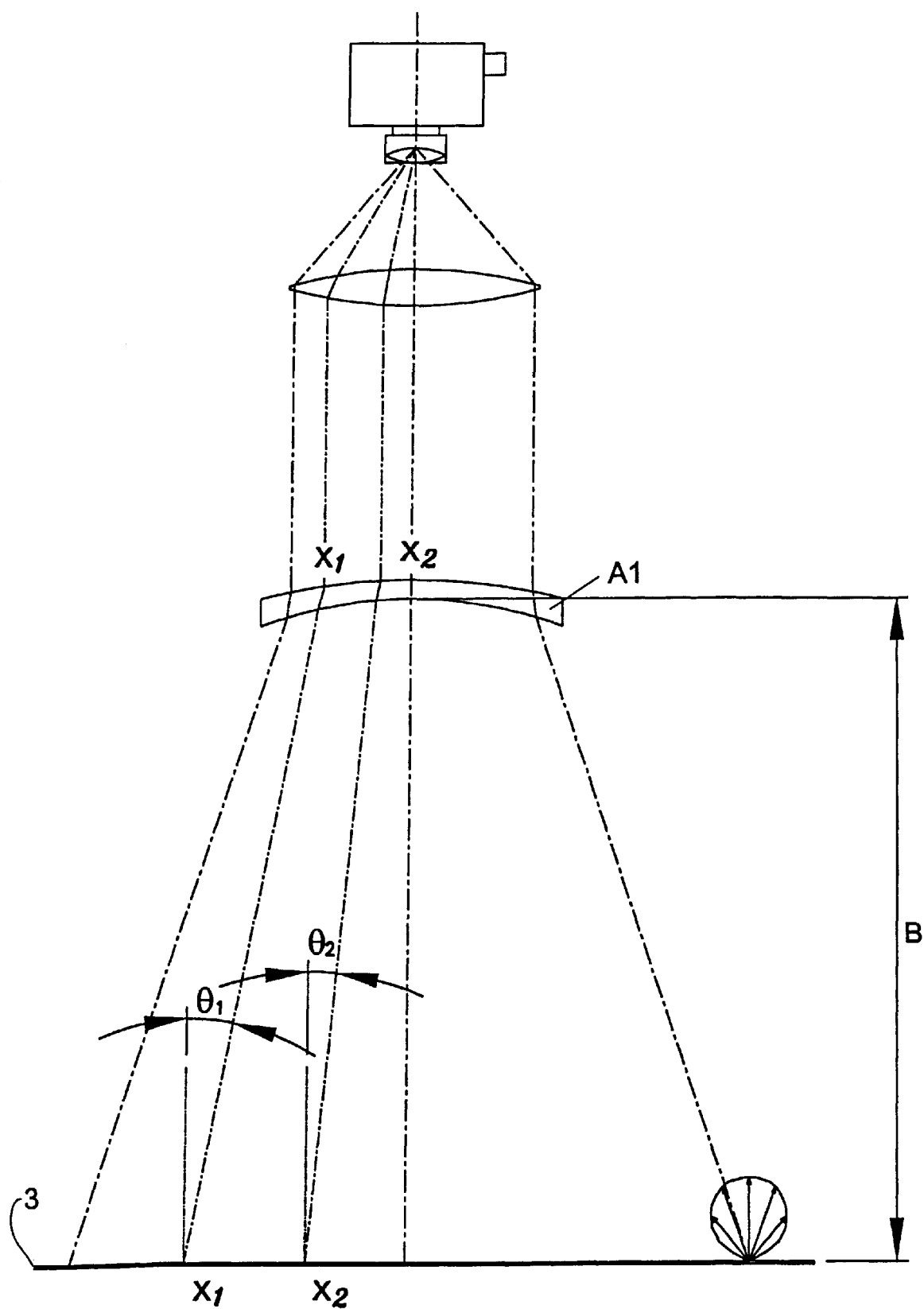
FIG. 2 is a schematic illustration of the system of FIG. 1 in operation.

The computer 8 further uses the measured deformation of the pattern image for the calculation therefrom of the inspected object's refractive properties. With reference to FIG. 2, when the inspected optical object A1 is a spherical lens, its optical power may be calculated by use of the following equations:

$$\Phi = \frac{X_1 - X_2}{\tan(\theta_1) - \tan(\theta_2)} \quad (1)$$

$$\theta_1 = \operatorname{atan}\left(\frac{x_1 - X_1}{B}\right) \quad (2)$$

$$\theta_2 = \operatorname{atan}\left(\frac{x_2 - X_2}{B}\right) \quad (3)$$

where $x_1$ and $x_2$ are radial coordinates of points from which rays R1 and R2 outcome from the reference pattern 3 at angles $\theta_1$ and $\theta_2$. $X_1$ and $X_2$ are radial coordinates of points at which the rays R1 and R2 outcome from the inspected optical object A1, B is a distance between the optical object A1 and the reference pattern 3.

If the inspected optical object A1 is a thorical lens, its optical power (spherical and cylindrical) is to be calculated in the same way as that of a spherical lens but the coordinates $X_1$, $X_2$, $x_1$, and $x_2$ are to be measured in the main cross-sections of the lens (the cross-sections taken along the axes of the cylinder).

Prismatic power Z of a lens is to be calculated by use of the following formula:

$$Z = 100 \cdot \frac{x - X}{B} \quad (4)$$

A point on a lens's surface where x−X=0, constitutes its optical center with Z=0.

Figure 10A:
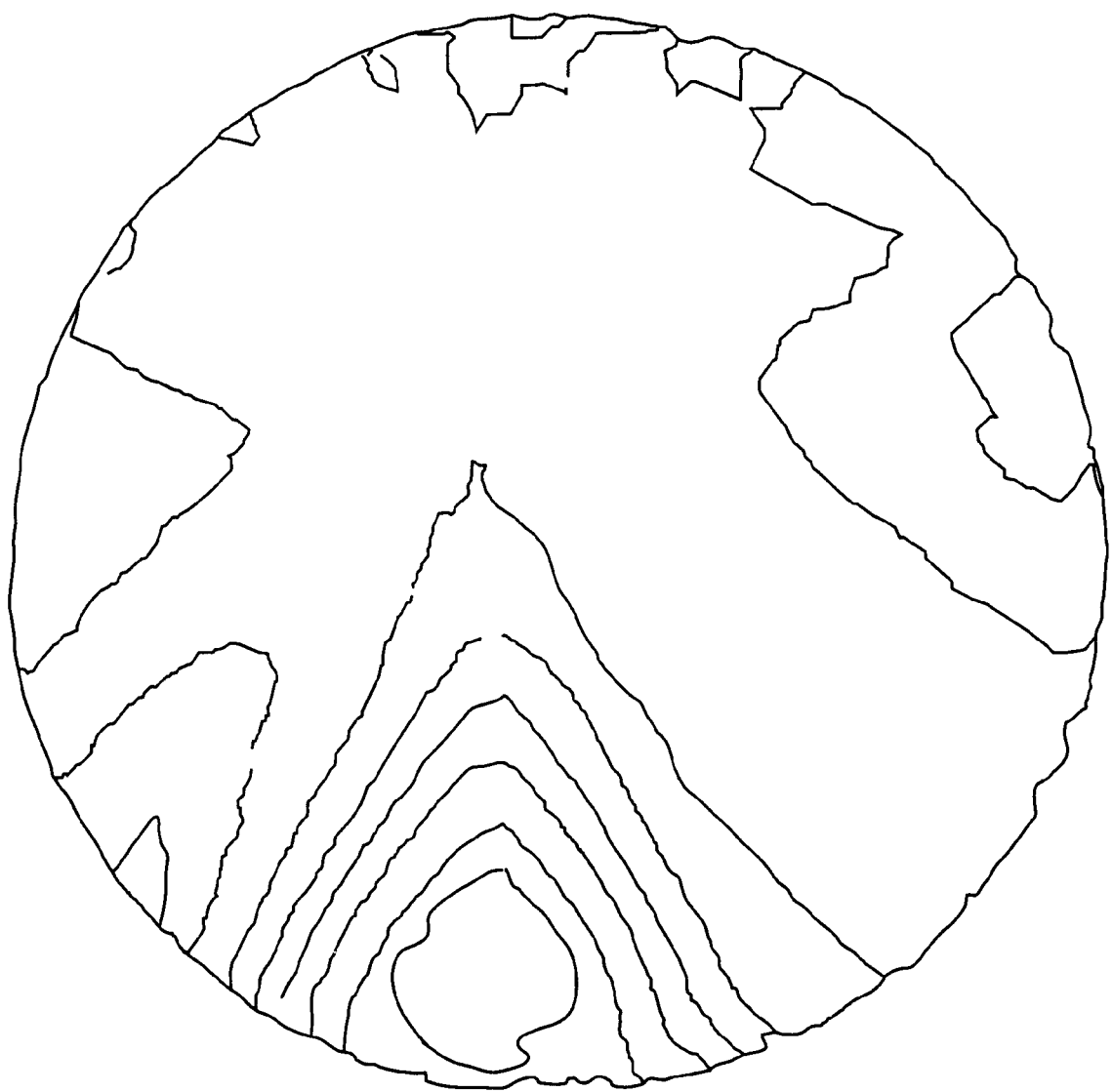
FIGS. 10A and 10B represent examples of spherical and cylindrical power maps of a progressive lens, obtained by means of a system of the present invention.
Figure 10B:
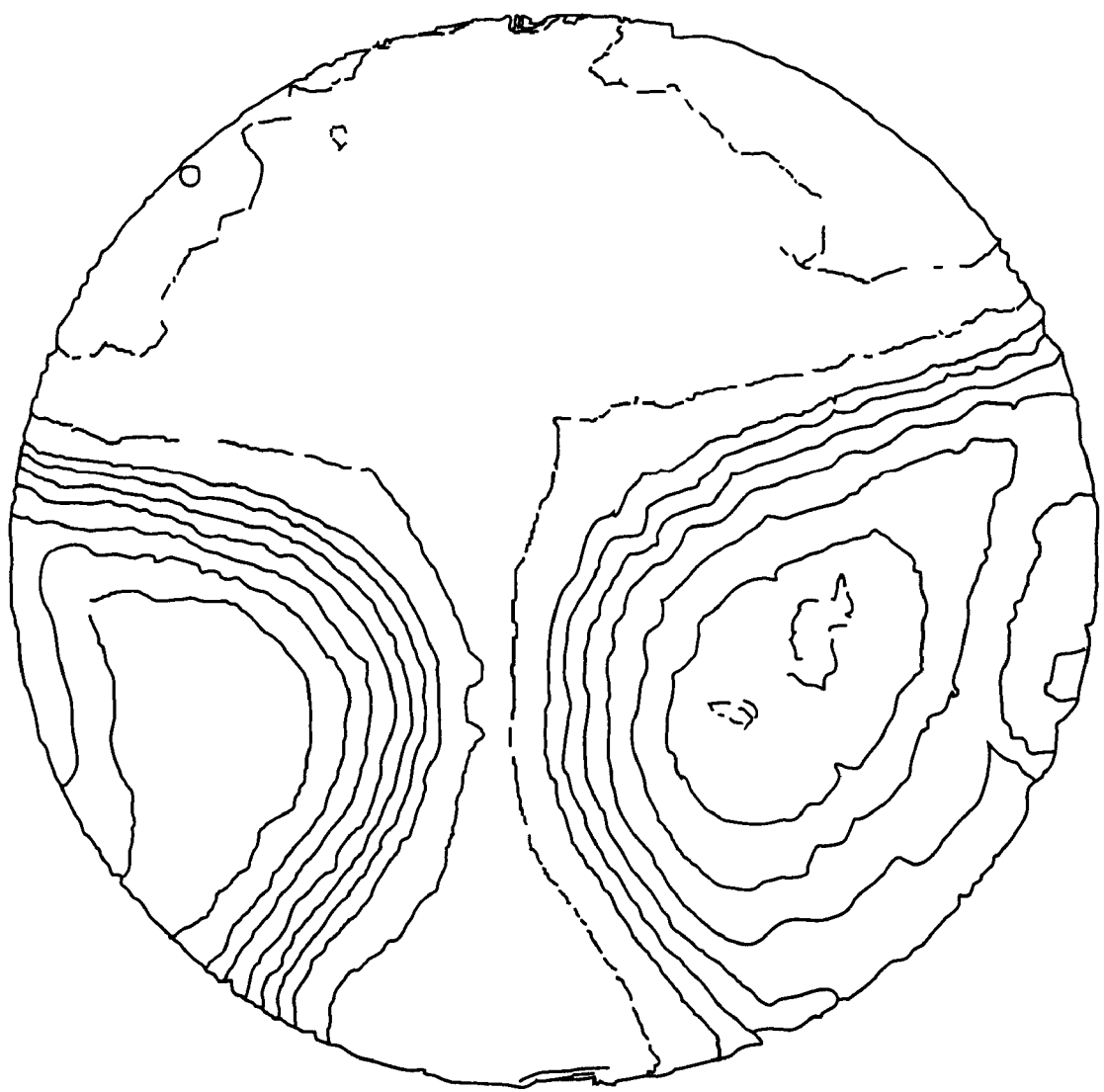

The output of the system working in a mapping mode will be spherical, cylindrical and prismatic power maps. Examples such maps obtained by means of a system of the present invention, are shown in FIGS. 10A and 10B. FIG. 10A shows a spherical power map of an ophthalmic progressive lens and FIG. 10B shows its cylindrical power map. It is also possible to calculate the lens power in reference points, as well as to find an optical center of the lens and, for each lens point, local axis of cylinder and prism.

Figure 3:
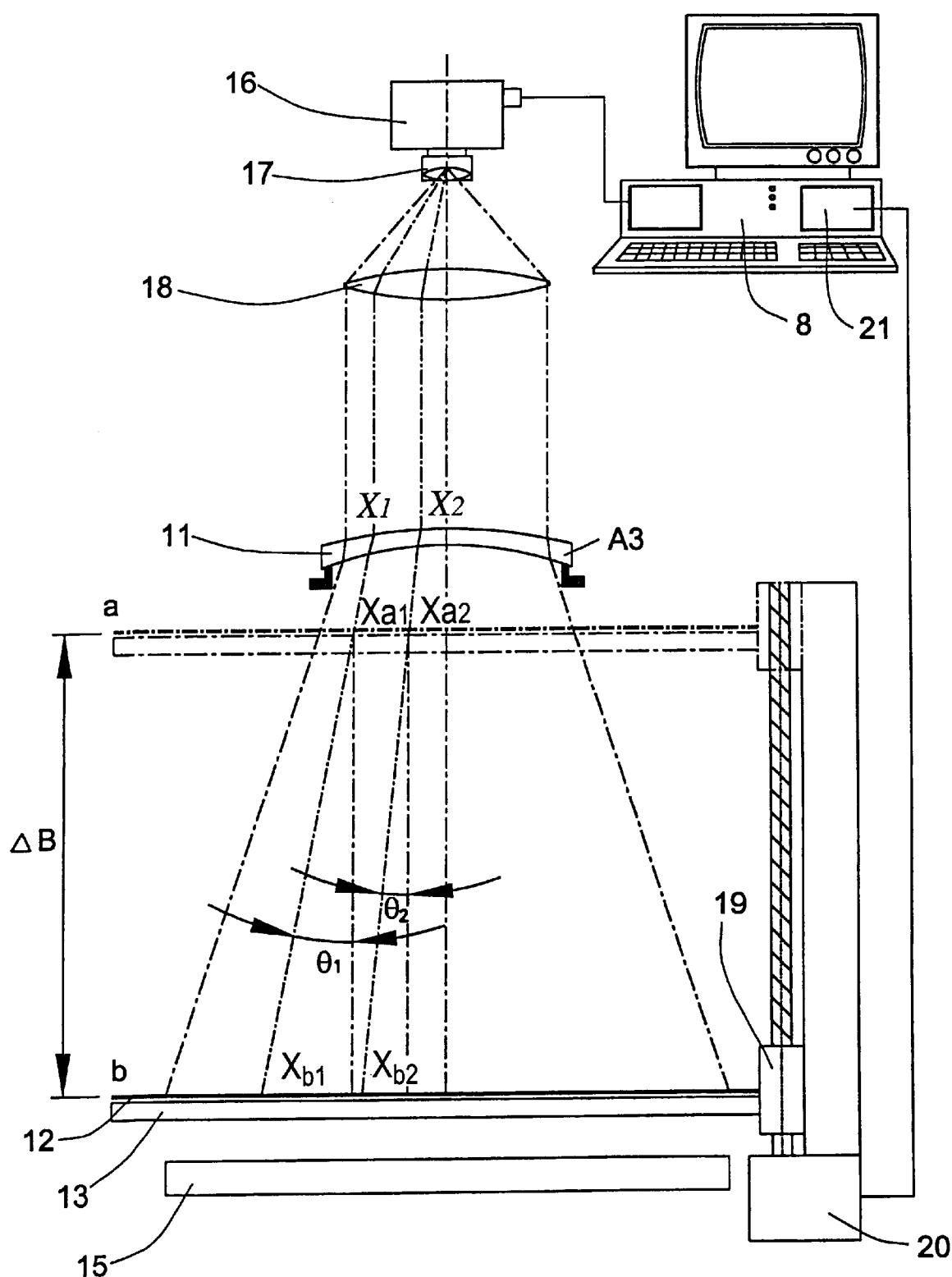
FIG. 3 is a schematic illustration of a system according to another embodiment of the present invention, which has an optical setup similar to that of FIG. 1 but a movable reference pattern support.

FIG. 3 illustrates a system according to another embodiment of the present invention, where measurements may be performed without the necessity of accurately pre-determining a distance between the inspected optical object and the reference pattern.

The system of FIG. 3 comprises a support 11 for mounting an optical object A3 to be inspected, a precision reference pattern 12 formed on a transparent diffusive plate 13, a light source in the form of LED matrix 15, an imaging and detecting means including a high resolution TV camera 16 with a camera lens 17 and an additional focusing lens 18 placed on an optical axis O of the system, and the computer 8. In this embodiment, the pattern 12 and the diffusive supporting plate 13 are fixed on a moveable slide 19 with a driver 20 in the form of stepper motor or servo motor controlled by the computer 8 via input/output board 21. Such an arrangement enables the movement of the pattern 11 with the diffusive plate 12 along the optical axis O of the system.

In operation, the optical object A3 to be inspected is placed on the support 11 and the TV camera 16 detects, records and transfers to the computer 8 at least two images of the pattern 12 taken through the optical object A3 at two positions 'a' and 'b' of the pattern 12. In this case, the formulas (2) and (3) above, defining angles θ1 and θ2 on which is based the calculation of optical power in formulas (1) and (2) above, will take the following form:

$$\theta_1 = \operatorname{atan}\left(\frac{x_{b1} - x_{a1}}{\Delta B}\right) \quad (5)$$

$$\theta_2 = \operatorname{atan}\left(\frac{x_{b2} - x_{a2}}{\Delta B}\right) \quad (6)$$

where $x_{a1}$ and $x_{b1}$ and $x_{a2}$ and $x_{b2}$ are radial coordinates at points at which respective rays R1 and R2 outcome from the pattern 12 at respective positions 'a' and 'b' thereof, and $\Delta B$ is a distance between the positions 'a' and 'b' of the reference pattern 11.

Figure 4:
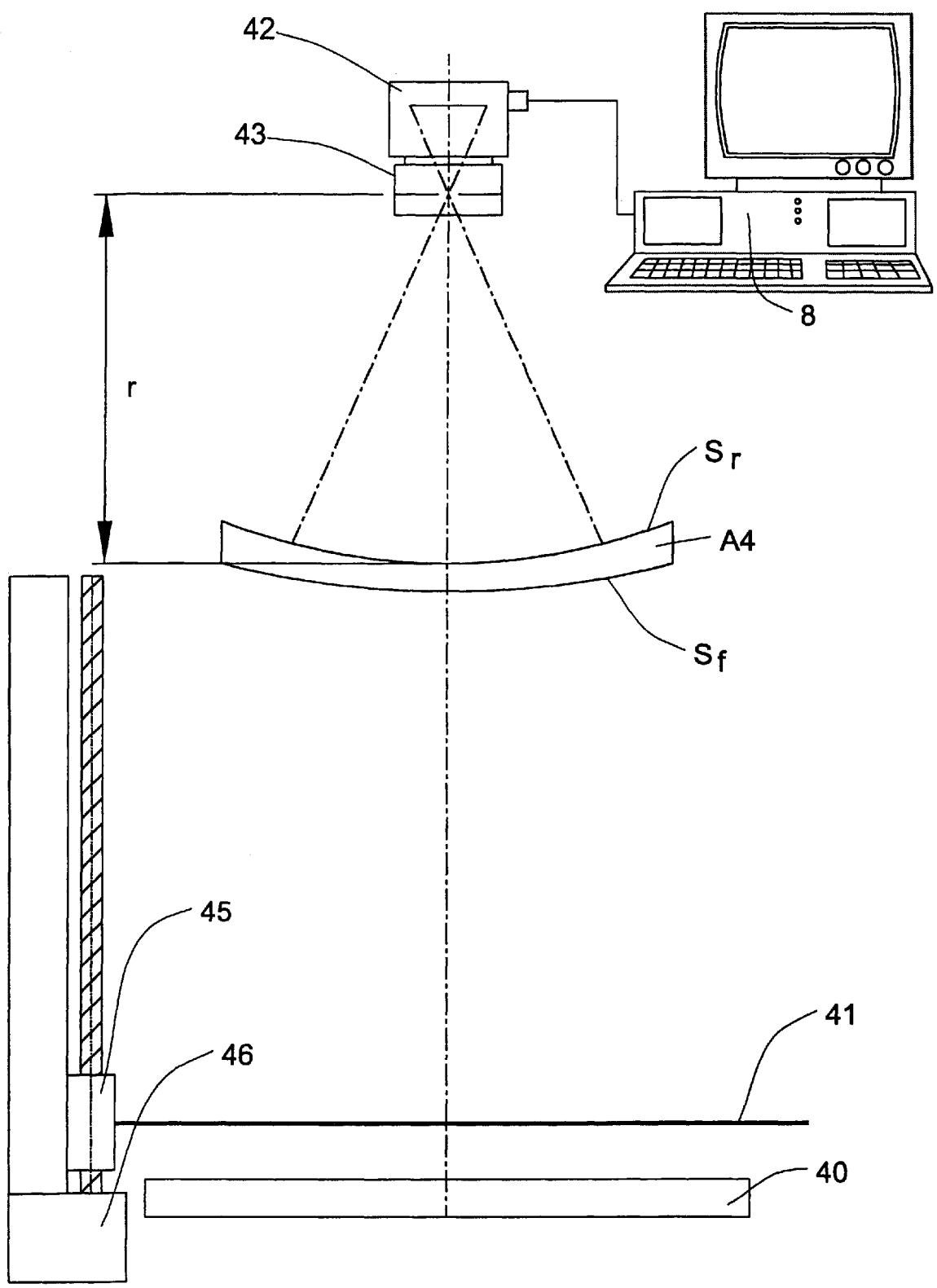
FIG. 4 is a schematic illustration of a system according to further embodiment of the present invention particularly suitable for testing an aspherical surface of a semi-finished progressive lens.
Figure 5:
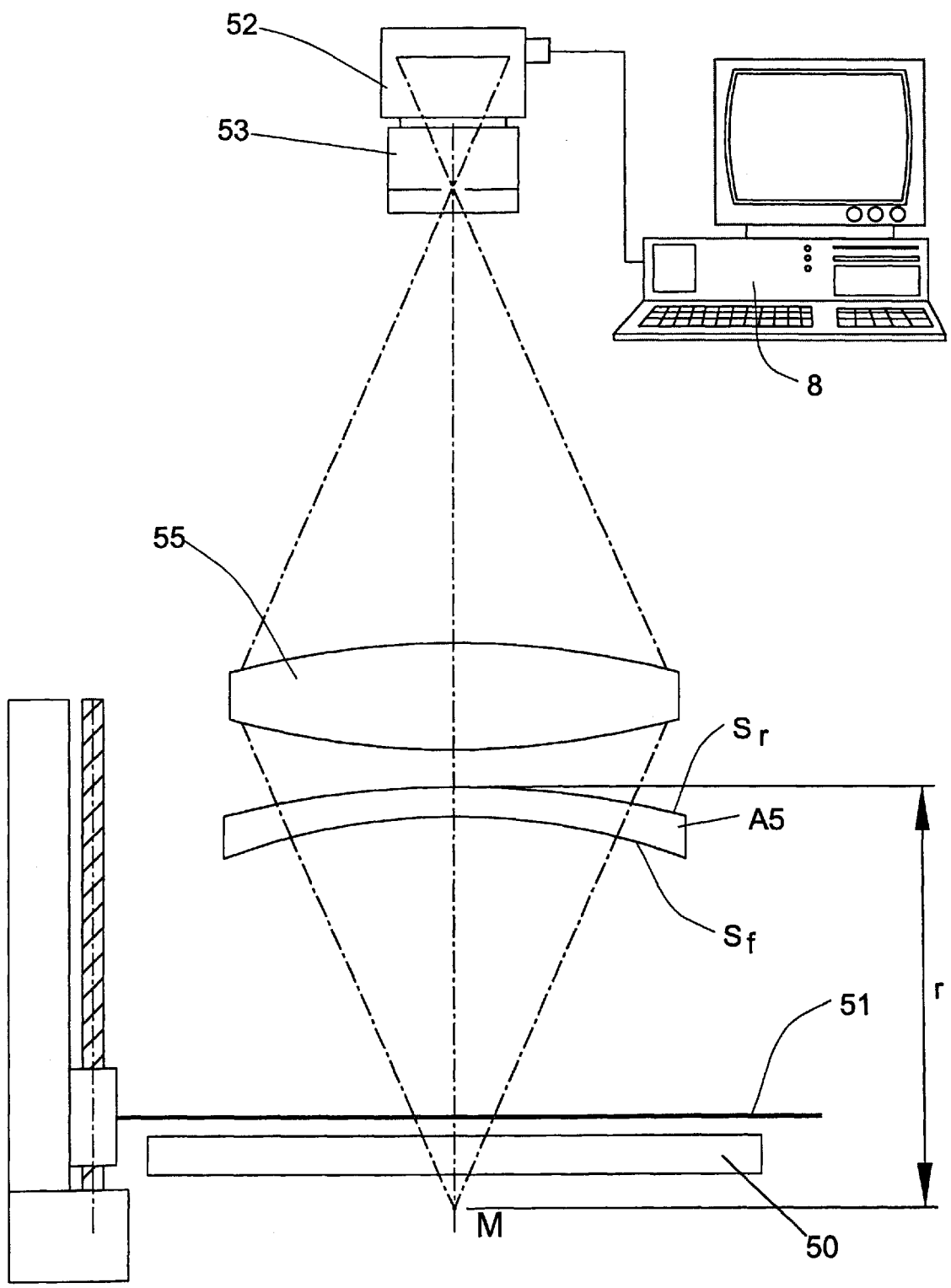
FIG. 5 is a schematic illustration of a system according to still further embodiment of the present invention particularly suitable for testing an aspherical surface of a mold designed for the production of a progressive lens.

FIGS. 4 and 5 illustrate systems according to further embodiments of the present invention, for mapping in transmission of an aspherical front surface Sf of an optical object whose rear surface Sr is spherical.

In particular, the system of FIG. 4 is designed for measuring a semi-finished progressive lens A4 with the front surface Sf having a convex aspherical shape and the rear surface Sr having a concave spherical shape. The system of FIG. 4 comprises an illumination means 40, a reference pattern 41, an imaging and detecting means in the form of TV camera 42 with a pinhole camera lens 43, and the computer 8. The optical object A4 is mounted on a support (not shown) disposed at a distance r from the pinhole lens 43, where r is a radius of curvature of the spherical rear surface Sr. The reference pattern 41 may be either fixed at a predetermined position for measurements similar to those in FIG. 1 or installed on a slider 45 with a driving means 46 for measurements similar to those in FIG. 3. In operation, beams outcoming from the reference pattern 41 are refracted by the aspherical front surface Sf and pass to the camera 42 without being refracted by the rear surface Sr.

The system of FIG. 5 is designed for measuring refractive properties of a glass mold A5 with the front surface Sf having a concave aspherical shape and the rear surface Sr having a convex spherical shape, intended for the production of a progressive lens of FIG. 4. The system comprises an illumination means 50, a reference pattern 51, an imaging and detecting means including a TV camera 52 with a camera lens 53 and a focusing optics 55, and the computer 8. The focusing optics 55 is designed to project the entrance pupil of the camera lens 53 into a point M spaced from the pattern 51 in the direction away from the imaging and detecting means. The inspected optical object A5 is disposed at a distance r from the point M, where r is the radius of curvature of the convex spherical rear surface Sr. In operation, beams outcoming from the reference pattern 51 are refracted by the aspherical front surface Sf and pass to the camera 52 without being refracted by the rear surface Sr.

Figure 6A:
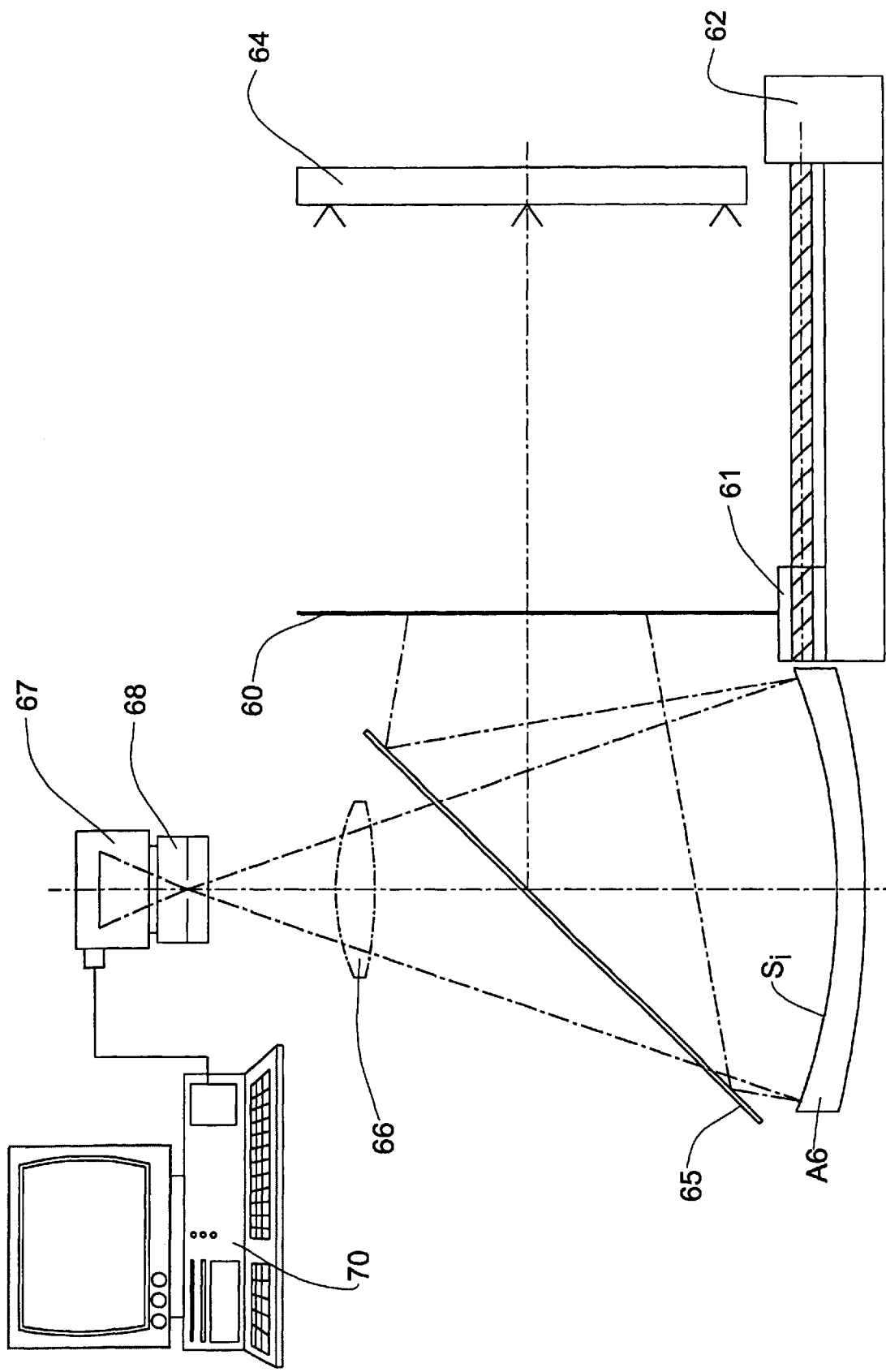
FIGS. 6A, 6B, 7A and 7B are schematic illustrations of different systems according to still further embodiments of the present invention, designed for testing reflective surfaces of optical objects.
Figure 6B:
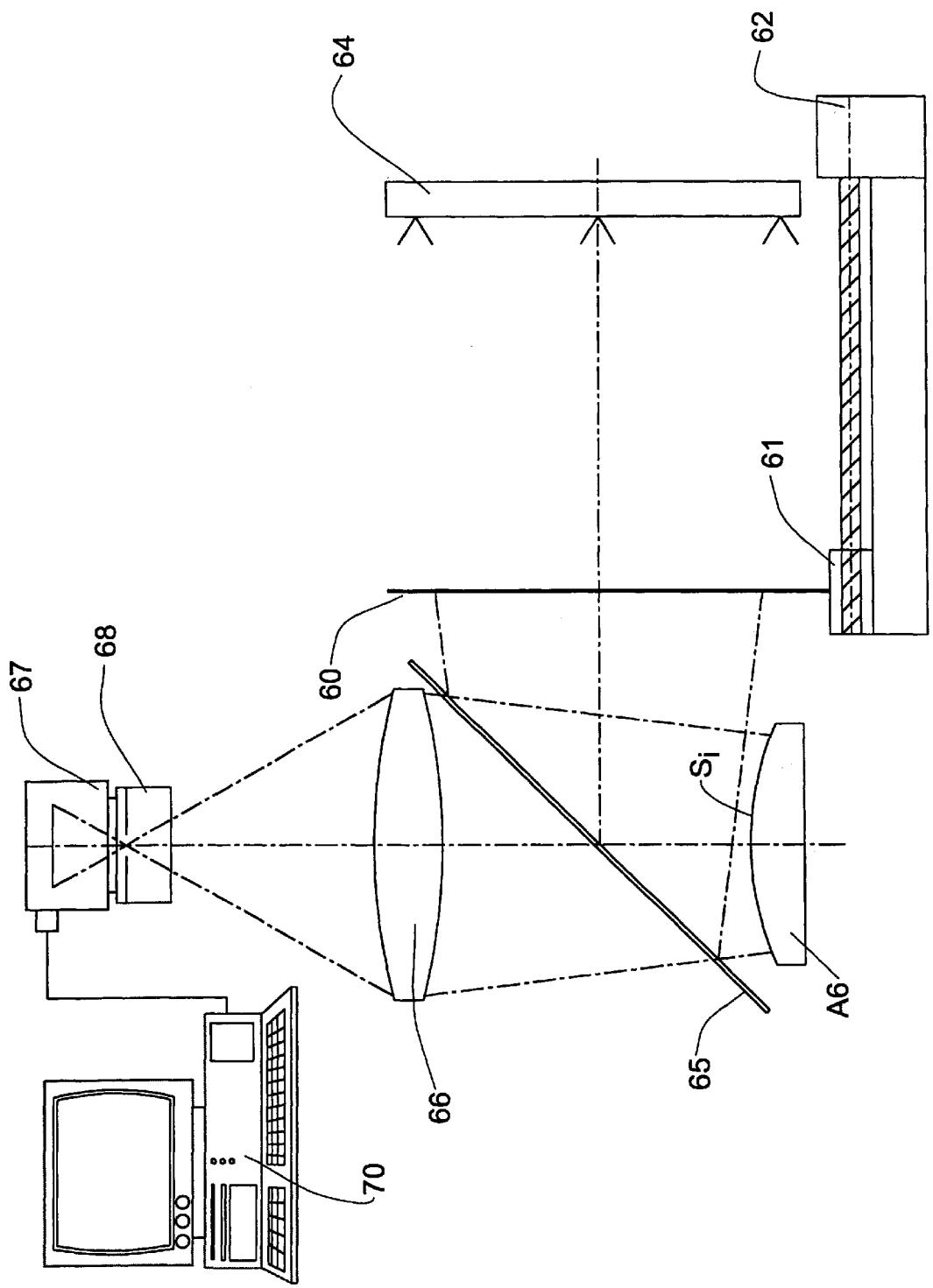

FIGS. 6A and 6B illustrate systems according to further embodiments of the present invention, designed for testing optical objects with at least one reflecting surface such as metallic, ceramic and/or glass molds for production of progressive lenses, aspheric mirrors, progressive lenses, etc.

Systems shown in FIGS. 6A and 6B comprise a reference pattern 60 installed on moveable slider 61 driven by a motor 62, a diffusive light source 64 for illuminating the pattern 60, a beamsplitter 65, a field-of-view adjusting optics 66, a CCD camera 67 with a camera lens 68, a computer 70 with a frame grabber and I/O board, and a support (not shown) for an optical object A6 located on an optical axis of the system between the reference pattern 60 and the beamsplitter 65. The optical element A6 has an inspected surface Si which in FIG. 6A has a concave shape and in FIG. 6B has a convex shape. Depending on the shape of the inspected surface Si, the field-of-view adjusting optics 66 has an appropriate design to form, in combination with the camera lens 68, a setup suitable for taking images in converging illuminating beams (FIG. 6A) and diverging illuminating beams (FIG. 6B). The field-of-view adjusting optics 66 may also be designed to work in parallel light or it even may be removed, when concave surfaces of a specific shape are inspected.

In operation, the pattern 60 is illuminated by the diffusive light source 64 and a plurality of illuminating beams outcoming from each point of the pattern obtained thereby are directed by the beamsplitter 65 to a reflecting surface of the inspected optical element A6, wherefrom they are reflected to pass through the beamsplitter 65 and through the optics 66 towards the camera lens 68. Only those beams that pass through an entrance pupil of the camera lens 68 participate in the formation of an image of the reference pattern 60 on a detecting element of the CCD camera 67. The obtained image, or two images if the measurements are performed in two positions of the reference pattern 60, is/are stored in the memory of the computer 70 to be analyzed thereby in a manner similar to that discussed in previous embodiments.

Output of the above systems working in reflection will be either in the form of a physical topographical map which will give, for each point on the inspected surface of the optical object, the real height of the surface or equivalent optical spherical, cylindrical and prismatic power maps, as shown in FIGS. 10A and 10B.

Figure 7A:
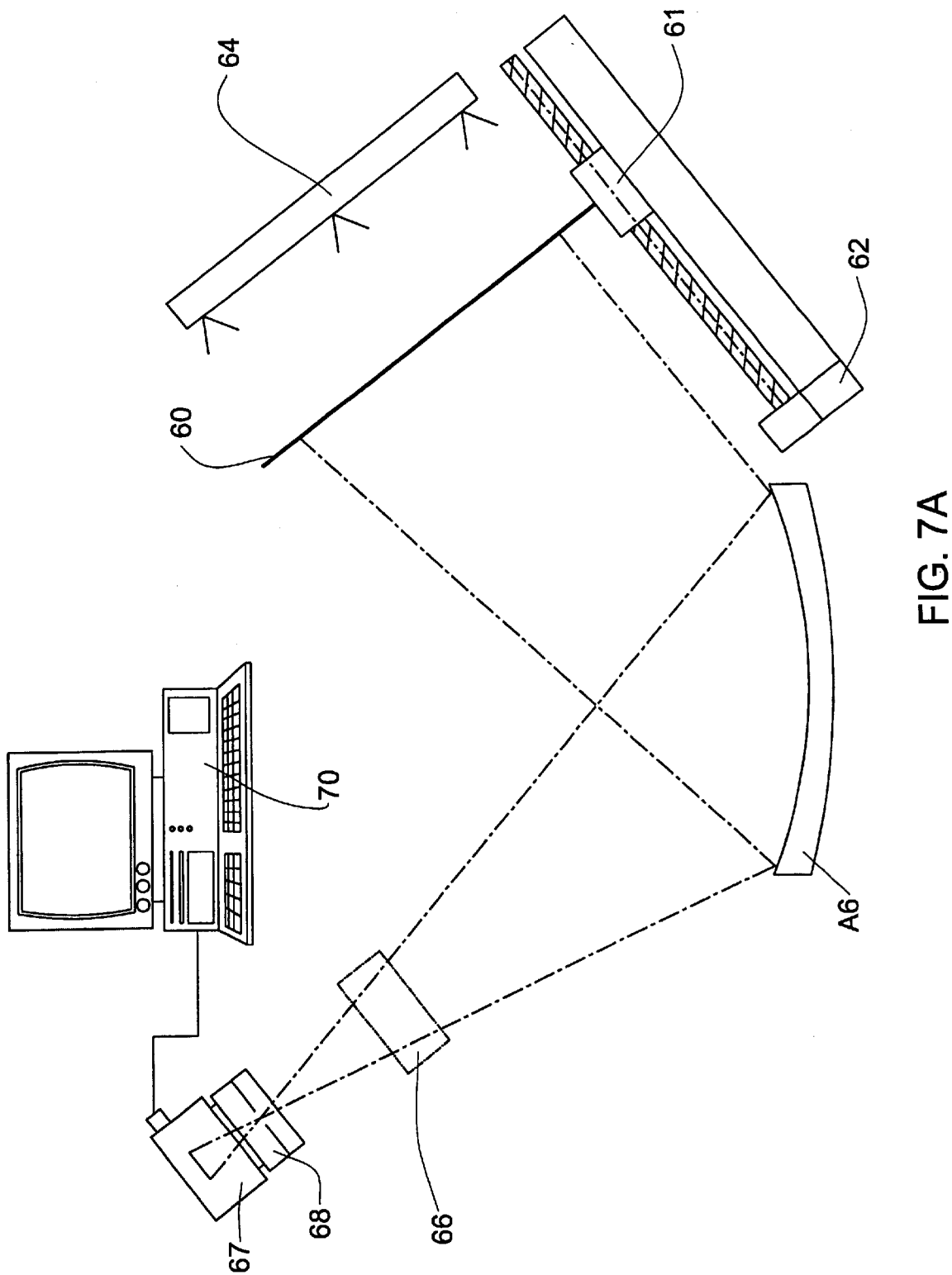
Figure 7B:
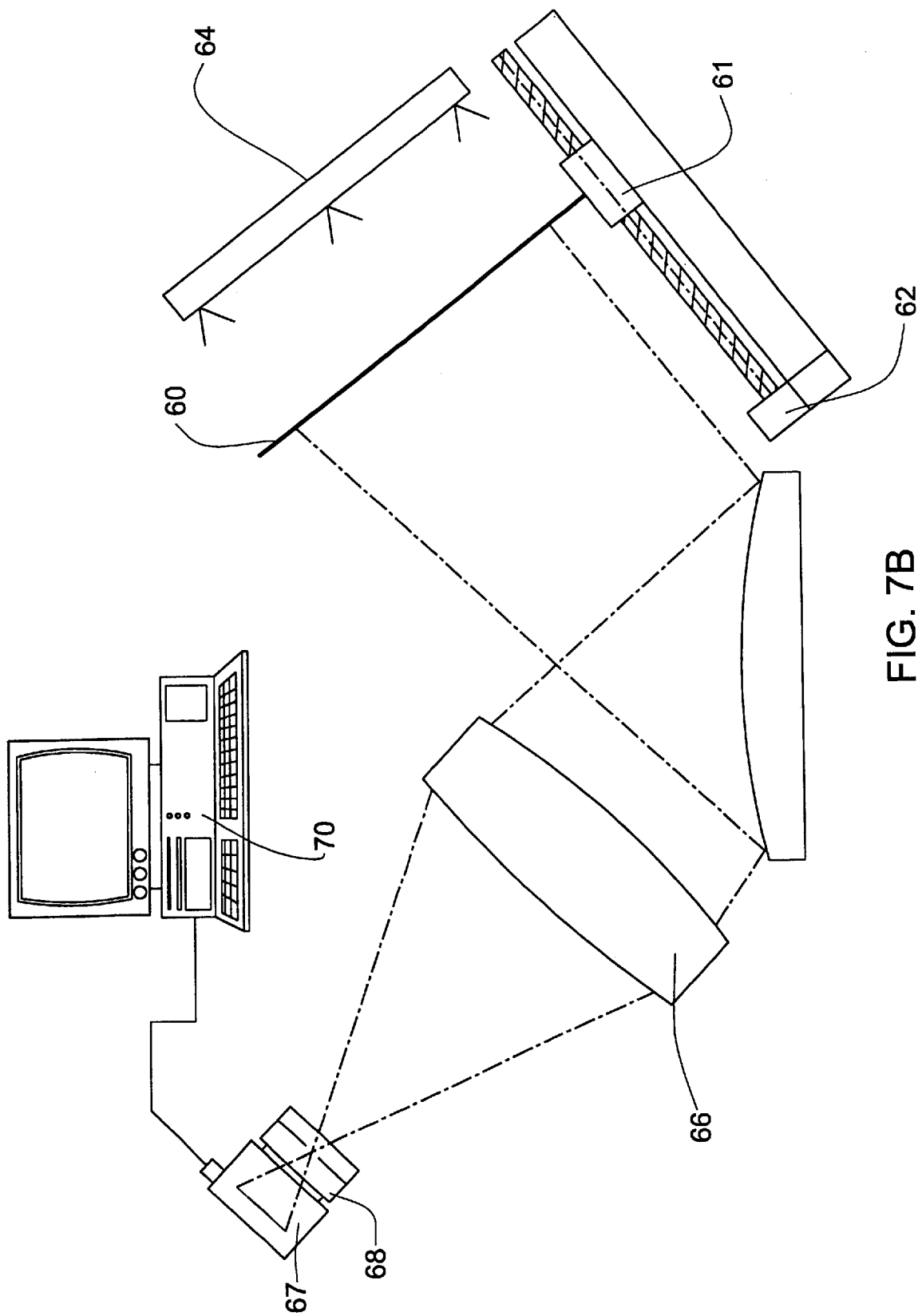

FIGS. 7A and 7B show setups similar to those of FIGS. 6A and 6B, designed for inspecting concave and convex surfaces in reflected light without a beamsplitting element.

It should be noted that methods and systems described above and illustrated by the drawings should be considered as non-restricting embodiments of the present invention, whilst there may exist different modifications and variations of the invention within the scope of the claims.

What is claimed is:

1. A method for automatic non-contact measuring optical properties of an optical object by means of a system comprising a light source, a reference pattern, an imaging and detecting means, at least the reference pattern and the imaging and detecting means being disposed on an optical axis on the system, and an image processing means, said method comprising the steps of:

(a) disposing said optical object between said reference pattern and said imaging and detecting means coaxially therewith;
   (b) directing to said pattern an illuminating light from said light source in such a manner as to produce a plurality of illuminating light beams outcoming from each point of the pattern at different angles;
   (c) imaging said pattern through said optical object by means of imaging beams such that only one of said plurality of the illuminating beams has a conjugated imaging beam, and detecting the image, by said imaging and detecting means, and
   (d) processing said image by said image processing means and producing a measurement output.

2. A method according to claim 1, wherein steps (b) and (c) are performed with the reference pattern being disposed by step (a) at two different positions and step (d) is performed based on two images obtained thereby.

3. A method according to claim 1, wherein step (b) is performed by said light source being a diffusive illuminator.

4. A method according to claim 1, wherein step (b) is performed by forming said reference pattern on a diffusive plate.

5. A method according to claim 1, wherein in step (c) said imaging and detecting means include a camera lens with an entrance pupil allowing only a minority of light beams that outcome from the optical object and correspond to different points of said reference pattern, to pass through said entrance pupil.

6. A method according to claim 5, wherein said imaging and detecting means direct to the entrance pupil only those light beams that outcome from the optical object substantially parallel to each other, said light beams being conjugate with the illuminating beams outcoming from different points of the reference pattern.

7. A method according to claim 1, wherein step (d) is performed by comparing the image with an image of said pattern obtained by said imaging and detecting means in the absence of said optical object.

8. A method according to claim 1, adapted for measuring a spherical optical power of said object at any predetermined point.

9. A method according to claim 1, adapted for measuring a cylindrical optical power and cylinder axis of said object at any predetermined point.

10. A method according to claim 1, adapted for measuring a prismatic optical power and a prism axis of said object at any predetermined point.

11. A method according to claim 1, adapted for measuring a location of an optical center of said optical object.

12. A system for automatic non-contact measuring optical properties of an optical object, comprising a light source, a reference pattern, an imaging and detecting means, at least the reference pattern and the imaging and detecting means being disposed on an optical axis of the system, a support for the optical object located between said reference pattern and said imaging and detecting means for disposing thereon the optical object coaxially with said pattern and said imaging and detecting means, said light source being capable of directing to said pattern an illuminating light in such a manner as to produce a plurality of illuminating light beams outcoming from each point of the pattern at different angles, said imaging and detecting means being capable of obtaining an image of said pattern through said optical object so that only one of said plurality of the illuminating beam has a conjugated imaging beam, and of recording said image, and an image processing means for processing said image and producing a measurement output.

13. A system according to claim 12, wherein said light source is a diffusive illuminator.

14. A system according to claim 12, wherein said reference pattern is formed on a diffusive plate.

15. A system according to claim 7, wherein said imaging and detecting means include a camera with a camera lens having a pin-hole entrance pupil.

16. A system according to claim 15, wherein said imaging and detecting means include focusing optics for directing a part of light beams that outcome from the optical object to said entrance pupil, said light beams being conjugate with the illuminating beams outcoming from different points of said reference pattern.

17. A system according to claim 16, wherein said focusing optics directs to said entrance pupil those of the light beams conjugate with the illuminating beams outcoming from different point of said reference pattern, that outcome from the optical object substantially parallel to each other.

18. A system according to claim 12, further comprising means for moving said reference pattern into at least two positions, and said image processing means being capable of providing said measurement output based on images of the reference pattern taken in the two positions thereof.

19. A system according to claim 12, wherein said measurement output is a spherical optical power of said object at any predetermined point.

20. A system according to claim 12, wherein said measurement output is a cylindrical optical power and cylinder axis of said object at any predetermined point.

21. A system according to claim 12, wherein said measurement output is a prismatic optical power and a prism axis of said object at any predetermined point.

22. A system according to claim 12, wherein said measurement output indicates to the location of said optical object's optical center.

23. A system according to claim 12, wherein said measurement output is a spherical optical power map.

24. A system according to claim 12, wherein said measurement output is a cylindrical optical power map and a vector field of the cylinder axes.

25. A system according to claim 12, wherein said measurement output is a prismatic optical power map, a vector field of the prism axes and an optical center of the optical object.

26. A system according to claim 12, wherein said measurement output is a topographical map.

* * * * *